April 7, 1964

J. GÖBEL 3,128,197

CERAMIC UNDERGLAZE DECALCOMANIA AND
METHOD OF MAKING SAME

Filed July 11, 1961

FIG. 1.

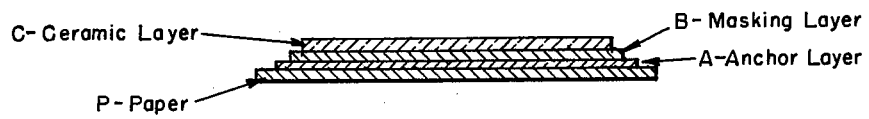

C- Ceramic Layer
B- Masking Layer
A-Anchor Layer
P- Paper

FIG. 2.

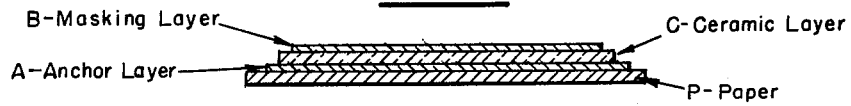

B- Masking Layer
C- Ceramic Layer
A- Anchor Layer
P- Paper

FIG. 3.

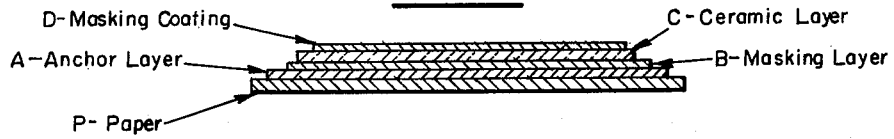

D- Masking Coating
C- Ceramic Layer
A- Anchor Layer
B- Masking Layer
P- Paper

LEGEND

A- Water Soluble Anchoring Layer Consisting
Of Vinyl Carboxylic Resin

B- Water Insoluble Hydrophylic Masking Layer
Consisting Of Vinyl Resin

C- Ceramic Color Design

D- Water Insoluble Hydrophylic Masking Coating
Consisting Of Vinyl Resin (Same As B)

P- Paper Carrier

INVENTOR
Johannes Göbel

BY Thomas V. Michaelis

ATTORNEY 3,128,197
CERAMIC UNDERGLAZE DECALCOMANIA AND
METHOD OF MAKING SAME
Johannes Göbel, Aschaffenburg (Main), Germany, assignor to Buntpapierfabrik A.G., Aschaffenburg (Main), Germany
Filed July 11, 1961, Ser. No. 123,124
10 Claims. (Cl. 117—3.5)

The present invention relates to decalcomania, and more particularly to decalcomania for ceramic underglaze application and methods of preparing the same.

This application is a continuation-in-part of my copending application for U.S. Letters Patent, Serial No. 724,819, filed March 31, 1958, now issued as United States Patent No. 3,015,574.

The afore-noted prior application discloses a method of preparing ceramic underglaze decalcomania, comprising applying a water soluble base coating of dextrin, gum arabic, starch or polyvinyl alcohol, on a carrier, usually paper, applying a design in ceramic color with the aid of a binder, and applying a hydrophilic masking coating on the ceramic color design coating, this masking coating containing a film forming ingredient consisting of a hydrophilic carboxy group containing polyvinyl compound. The prior application also discloses the modification where a masking coating consisting of a hydrophilic carboxy group containing polyvinyl compound is applied on the base coated carrier, and the ceramic color design coating is applied on top of this masking coating, and the further modification where the ceramic color design coating is applied between two, inside and outside, masking coatings consisting of a hydrophilic carboxy group containing polyvinyl compound.

In the preparation of the decalcomania of my prior application, carboxy group containing polyvinyl compounds were used which though hydrophilic, where not water soluble, but were susceptible of swelling in water.

When these decalcomania are to be applied to ceramic underglaze material, they must be immersed in an activating agent, i.e., in an organic solvent for the polyvinyl compounds employed, such as methanol or methoxy butanol, or in an alkaline solution such as caustic soda solution, to render the masking coating or coatings of polyvinyl compounds viscid or adhesive so the ceramic color design will safely adhere to the ceramic underglaze surface. Once the design bearing layer has dried the carrier paper is moistened and withdrawn, whereupon the glaze is applied and the usual firing process effected.

It is an object of the present invention to further improve the method of my copending application by eliminating the activation step outlined above.

An ancillary object of this invention is to simplify, expedite and reduce the cost of the preparation and application of ceramic underglaze decalcomania, and to provide improved ceramic underglaze decalcomania thus prepared and applied.

Other objects and the manner in which the same are attained, will become apparent as this specification proceeds.

In accordance with the present invention, and in elaboration of the basic concept of my prior copending application noted above, I have discovered that the activation step can be eliminated if the water soluble base coating of dextrin, gum arabic, starch or polyvinyl alcohol applied between the carrier, such as paper, and either the ceramic color design coating, or else the water insoluble, carboxy group containing polyvinyl film coating, is replaced by a base coating containing a water soluble carboxy group containing polyvinyl compound or a water soluble salt of a lower or higher molecular carboxy group containing polyvinyl compound, which base coating on mere immersion of the decal in water, commences to be dissolved so as to be rendered adhesive, but which, when the design bearing layers are slid off the carrier, adheres to the layers thus slid off, thus enabling the base coating to serve without any prior activation, as the adhesive layer anchoring the design bearing layers on the porous ceramic underglaze material. Once the transfer picture has dried on the ceramic surface it firmly adheres thereto undisturbed by the subsequent firing process.

The novel anchoring and adhesive layer according to this invention may consist, as noted above, of water soluble low molecular carboxy group containing polyvinyl compounds, or of water soluble salts of low or high molecular carboxy group containing polyvinyl compounds, such as a low molecular carboxy group containing polyvinyl ether or ester, or polymethacrylic acid or the sodium salt thereof. The water soluble polyvinyl compounds contemplated for use as the anchoring and adhesive coatings of the present invention, differ from the polyvinyl compounds covered by my prior application, Serial No. 724,819, in the kind of polymerization or copolymerization on the one hand, and by their lower degree of polymerization on the other hand. The present compounds are water soluble whereas those disclosed by the prior application, while hydrophilic, are water insoluble and on immersion in water, will merely swell, the adhesive characteristics being required to be imparted by a distinct activating step.

The invention is illustrated by the following examples which are to be understood as having an explanatory rather than limitative purpose.

*Example 1*

On a carrier consisting of cellulose paper weighing 80 g. per square meter, a relatively thick layer (about 50μ calculated on dry substance) is applied by means of a doctor, this layer consisting of a 25% aqueous solution of "Plexileim" (a 25% solution of an alkali salt of a modified acrylic acid having a molecular weight between 500,000 and 1,000,000, manufactured by Rohm & Haas, Darmstadt, Germany). This layer hereinafter is referred to as layer A. When this layer has dried, a film is applied by silk screen printing, this film consisting of a solution of 20 kg. of a high polymer polyacrylic acid or a highly polymerized acrylate base copolymer having a molecular weight of about 200,000 ("Rohagit S" manufactured by Rohm & Haas, Darmstadt, Germany) in a mixture of 40 percent of ethyl alcohol and 40 percent of propyl alcohol. This layer will be referred to as layer B. When this layer has dried, the ceramic design is applied by silk screen printing, using ceramic colors with the usual binders, and the design bearing layer, referred to as layer C, is dried.

On immersion of the decalcomania thus produced, in water, the layer A softens to form a sticky material which permits the withdrawal of layers B and C from the carrier paper; the sticky material, however, adheres to the layers B and C, thus enabling these layers to adhere to the porous ceramic material in the absence of any special activation step. Glaze is sprayed on and the ceramic material bearing the transferred design is subjected to the usual firing process, at a temperature of 1100° C.

*Example 2*

On a cellulose paper having a weight of 100 g. per square meter there is applied by means of a doctor, a material containing 10 kg. of a low viscosity polyacrylic acid ("Rohagit S" manufactured by Rohm & Haas, Darmstadt, Germany) in 90 l. of a 3% solution of caustic soda. When this film of polyacrylic acid sodium (layer A) has dried, it is imprinted as usual by silk screen printing with ceramic colors (layer C). The design bearing layer is coated with a masking layer B comprising a carboxy group containing water insoluble polymethacrylic acid ester, and having, e.g., the following composition:

| | Kg. |
|---|---|
| Copolymer of 35% methacrylic acid and 65% methacrylic acid methyl ester ("Rohagit S 3" made by Rohm & Haas, Darmstadt, Germany | 18 |
| Ethyl glycol | 61.5 |
| Tetralin | 20.5 |

On immersion of the decalcomania thus produced the layer A commences to dissolve but adheres to the layers C and B when these are withdrawn from the carrier paper, thus serving to anchor the layers C and B on an unglazed, porous ceramic material without any activation. In order to facilitate the separation of the layers A, C and B from the carrier paper, the surface of the paper, preferably, is rendered water repellant. The layers A, C and B transferred on the ceramic material are dried and coated with a glaze, whereafter the design bearing ceramic material is subjected to the usual firing process at 1100° C.

*Example 3*

The carrier is a cellulose paper weighing 120 g. per square meter. With a doctor, a comparatively thick layer (about 50μ) of a low molecular water soluble modified polyacrylic acid having a molecular weight of 10,000–50,000 ("Acrytex W" manufactured by Rohm & Haas, Darmstadt, Germany) is applied, this layer being identified as layer A. When this layer has dried it is coated by silk screen printing, with the solution of a carboxy group containing water insoluble polyester on a crotonic acid basis ("Mowilith Ct 5" manufactured by Farbwerke Hoechst, Hoechst, Germany) of about the following composition:

| | G. |
|---|---|
| Polyester | 26 |
| Butyl acetate | 12 |
| Butyl glycol acetate | 12 |
| Glycolic butyl ester | 36 | this coating being hereinafter referred to as layer B.

The layer B is imprinted by silk screen printing with a ceramic color design coating, referred to as layer C, one or several colors being used according to requirements. Conventional silk screen printing oils serve as binders. If desired, the ceramic colors may also be printed by the offset process. The layer C is coated with a masking coating, layer D, having the same composition as layer B.

The decal thus produced is immersed in water with the result that the layer A commences to dissolve. The aggregate comprising the layers B, C and D, and part of the layer A, is withdrawn from the carrier paper and with the sticky, adhesive layer at the bottom, is placed on a porous ceramic article. When the transfer picture has dried, the ceramic article bearing the picture is coated with glaze and fired at 1100° C.

The invention is illustrated further by the drawing accompanying this specification and forming part thereof.

In the drawing,

FIG. 1 is a diagrammatic representation of a multi-layer decalcommania according to the invention;

FIG. 2 is a similar showing of a modification, and

FIG. 3 is a similar illustration of yet another embodiment of the invention.

Referring to the drawing wherein like elements are denoted by identical reference characters, and first to FIG. 1, this shows a multi-layer decalcomania comprising a bottom or carrier layer P, e.g., of paper, superposed on this carrier a water soluble separating and anchoring layer A essentially consisting of a water soluble carboxy group containing polyvinyl compound, superposed on this water soluble separating layer, a hydrophilic masking layer B essentially consisting of a water insoluble carboxy group containing polyvinyl compound, and applied on top of this masking layer, a ceramic color design coating C. This embodiment corresponds to the product obtained according to Example 1.

In the embodiment of the invention shown in FIG. 2, the bottom or carrier layer P and the separating and anchoring layer of a water soluble carboxy group containing polyvinyl compound A, are disposed as in the embodiment of FIG. 1, but the positions of layers B and C are reversed with the result that the ceramic color design coating C is applied on top of separating layer A, and the hydrophilic masking layer superposed on the design coating C. This embodiment corresponds to the product obtained according to Example 2.

The modification shown in FIG. 3 illustrates a carrier layer P and a separating and anchoring layer A applied on the carrier layer P, in the same arrangement as shown in FIGS. 1 and 2. The hydrophilic masking layer B is applied on the separating layer A, the ceramic color design coating C on the hydrophilic masking layer B, and another hydrophilic masking layer of the same composition as layer B, is superposed on the design coating C. This embodiment corresponds to the product obtained in accordance with Example 3.

Low molecular water soluble carboxy group containing polyvinyl compounds or salts of carboxy group containing polyvinyl compounds which can be used in the preparation of a water soluble separating layer disposed between the carrier and the design bearing layer, or between the carrier and the water insoluble carboxy group containing polyvinyl compound, may be exemplified by "Mowilith Ct 5A" manufactured by Farbwerke Hoechst, Hoechst, Germany (an ammonium salt of a vinyl acetate-crotonic acid copolymer), "Plexileim" made by Rohm & Haas, Darmstadt, Germany (a solution of an alkali salt of a modified acrylic acid having a molecular weight between 500,000 and 1,000,000), "Pigment Verteiler A" manufactured by Badische Anilin & Sodafabriken, Ludwigshafen, Germany (a 30% aqueous solution of a low polymer polyacrylic acid ammonium salt), "Latecoll AS" also made by BASF, Ludwigshafen, Germany (a 10% aqueous solution of a high polymer polyacrylic acid ammonium salt), "Rohagit S 3" manufacturede by Rohm & Haas, Darmstadt, Germany (in the form of the sodium salt of a carboxy group containing copolymer with acid esters of a molecular weight of 100,000), and "Rohagit S" also made by Rohm & Haas, Darmstadt (in the form of the ammonium salt or triethanolamine salt of a carboxy group containing copolymer with acid esters on an acrylate basis).

The hydrophilic polymer used in the masking coating or coatings may be a hydrophilic, water insoluble polymer such as polyacrylic acid, polymethacrylic acid and maleic acid polymer, or a copolymer of said acids with polymethacrylic acid ester, polyacrylic acid ester, polyvinyl chloride, polyvinylidene chloride, polyvinyl acetate, polyvinyl alkyl ether, polyvinyl acetal and styrene, as more fully disclosed in my prior application Serial No. 724,819.

The ceramic coloring material is applied in a binder such as varnish, drying oil or lacquer, as also more fully disclosed in my copending application Serial No. 724,819.

I wish it to be understood that I do not desire to be limited to the exact details of procedure, composition or application, as modifications within the scope of the appended claims and involving no departure from the spirit of the invention nor any sacrifice of the advantages thereof, may occur to workers in this field.

I claim:

1. The method of preparing a ceramic underglaze decalcomania comprising applying on a carrier a water soluble layer, and applying thereon in optional sequence a design in ceramic colors and a hydrophilic masking coating containing a film forming ingredient consisting of a water insoluble carboxy group containing polyvinyl compound, said water soluble layer essentially consisting of a water soluble carboxy group containing polyvinyl compound and serving as an anchoring and separating layer.

2. The method according to claim 1, wherein the water soluble layer essentially consists of a low molecular carboxy group containing polyvinyl compound.

3. The method according to claim 1, wherein the water soluble layer essentially consists of a water soluble salt of a low molecular carboxy group containing polyvinyl compound.

4. The method according to claim 1, wherein the water soluble layer essentially consists of a water soluble salt of a high molecular carboxy group containing polyvinyl compound.

5. The method according to claim 1, wherein the water soluble anchoring and separating layer essentially consists of a water soluble low molecular carboxy group containing acrylic acid polymer.

6. The method according to claim 1, wherein the water soluble anchoring and separating layer essentially consists of a water soluble low molecular carboxy group containing methacrylic acid polymer.

7. The method according to claim 1, wherein the water soluble anchoring and separating layer essentially consists of a water soluble low molecular carboxy group containing crotonic acid polymer.

8. The method according to claim 1, wherein the water soluble anchoring and separating layer essentially consists of a water soluble low molecular carboxy group containing maleic acid polymer.

9. A decalcomania particularly adapted for ceramic underglaze application, comprising a carrier, a water soluble anchoring and separating layer on said carrier, said water soluble layer essentially consisting of a water soluble carboxy group containing polyvinyl compound, a ceramic color design coating on said water soluble anchoring and separating layer, and a hydrophilic masking coating essentially consisting of a water insoluble carboxy group containing polyvinyl compound on said design coating, said water soluble layer commencing to dissolve on immersion in water thus releasing the design and masking coatings to which a part of it adheres, said adhering part of the water soluble layer serving to anchor the design and masking coatings on the ceramic material.

10. A decalcomania according to claim 9, wherein said masking coating underlies as well as covers said ceramic color design coating.

References Cited in the file of this patent

UNITED STATES PATENTS

| | | |
|---|---|---|
| 2,715,590 | Brockman et al. | Aug. 16, 1955 |
| 3,015,574 | Gobel | Jan. 2, 1962 |